United States Patent [19]
Taylor

[11] Patent Number: 5,265,552
[45] Date of Patent: Nov. 30, 1993

[54] SHOCK AND VIBRATION ISOLATOR FOR MEMBER MOUNTED ON SUBMERGED BODY

[75] Inventor: Douglas P. Taylor, N. Tonawanda, N.Y.

[73] Assignee: Taylor Devices, Inc., North Tonawanda, N.Y.

[21] Appl. No.: 763,413

[22] Filed: Sep. 20, 1991

[51] Int. Cl.$^5$ .............................................. B63B 59/02
[52] U.S. Cl. .................................... 114/219; 267/141; 405/212
[58] Field of Search .................. 114/218, 219, 259, 13; 188/268; 267/116, 140, 141

[56] References Cited

U.S. PATENT DOCUMENTS

| | | | |
|---|---|---|---|
| 3,235,244 | 2/1966 | Hein | 114/219 X |
| 3,773,008 | 11/1973 | Guienne et al. | 114/219 |
| 3,863,589 | 2/1975 | Guienne et al. | 114/219 |
| 4,043,545 | 8/1977 | Dial et al. | 114/219 |
| 4,389,045 | 6/1983 | Taylor | 267/8 R |
| 4,428,568 | 1/1984 | McNatt et al. | 114/219 |
| 4,591,030 | 5/1986 | Antkowiak | 188/268 |
| 4,650,371 | 3/1987 | Sawaragi et al. | 114/219 |
| 4,679,517 | 7/1987 | Kramer | 114/219 |
| 4,773,349 | 9/1988 | McKinney | 114/219 |

Primary Examiner—Sherman Basinger
Attorney, Agent, or Firm—Joseph P. Gastel

[57] ABSTRACT

A shock and vibration isolator for a member mounted on a body immersed in water including a housing, a rubber plunger mounted within the housing to define a chamber within the housing, vent apertures in the housing for permitting water to be pumped relative to the chamber in response to deflection of the rubber body, and a connector attached to the rubber body for mounting the member which is to be isolated from the body which is immersed in water, the rubber body and the associated chamber providing a combination of resilient and hydraulic support to thereby isolate the member from shock and vibration forces relative to the body.

18 Claims, 3 Drawing Sheets

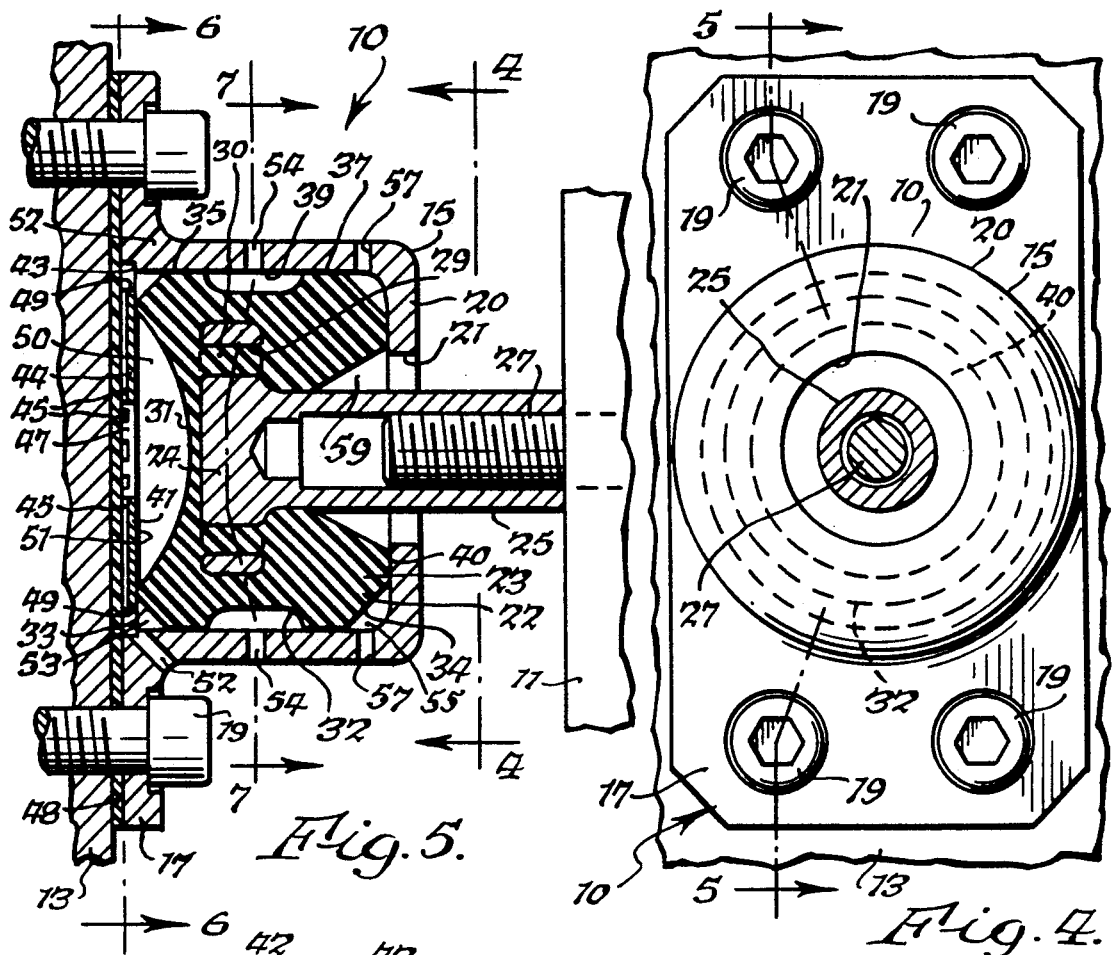
Fig. 5.
Fig. 4.
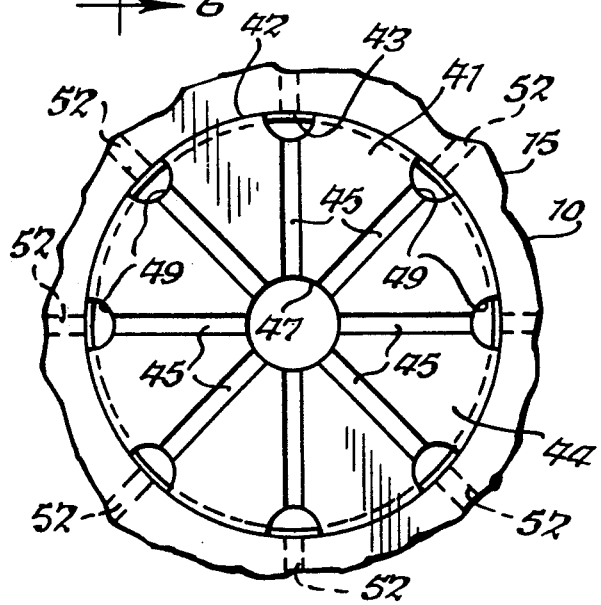
Fig. 6.
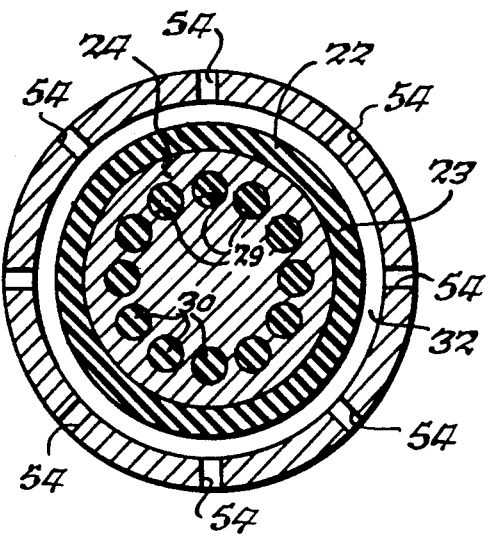
Fig. 7.

PLAIN RUBBER SPRING UNDER SHOCK LOADING

ISOLATOR 10 UNDER SHOCK LOADING

PLAIN RUBBER MOUNTING & ISOLATOR 10 UNDER FORCED VIBRATION

SHOCK AND VIBRATION ISOLATOR FOR MEMBER MOUNTED ON SUBMERGED BODY

BACKGROUND OF THE INVENTION

The present invention relates to a shock and vibration isolator for members, such as sonar arrays, mounted on a body which is under water, such as the hull of a ship or a submarine.

By way of background, sonar arrays are mounted on the submerged portion of a hull of a ship and on a submarine. The sonar arrays transmit signals to the instrumentation within the ship's body. However, in the interest of providing accurate signals, the sonar arrays must be mounted against shock and vibration forces to which the submerged body may be subjected.

SUMMARY OF THE INVENTION

It is one object of the present invention to provide a shock and vibration isolator for a member mounted on an underwater body, the shock and vibration isolator functioning to provide both a resilient and hydraulically damped support for the member.

Another object of the present invention is to provide a shock and vibration isolator for a member mounted on an underwater body wherein the shock isolation utilizes the water in which the body is submerged, thereby assuring an adequate supply of hydraulic shock absorbing medium under all circumstances of operation.

A further object of the present invention is to provide a shock and vibration isolator for a member mounted on an underwater body, the isolator being relatively simple in construction and reliable in operation. Other objects and attendant advantages of the present invention will readily be perceived hereafter.

The present invention relates to a shock and vibration isolator for a member mounted on a body immersed in water comprising a housing, means for mounting said housing on said body, elastomeric means in said housing, chamber means defined by said elastomeric means, conduit means for permitting communication between said chamber means and said water in which said body is immersed, and means for coupling said elastomeric means to said member which is to be vibration and shock isolated relative to said body.

The various aspects of the present invention will be more fully understood when the following portions of the specification are read in conjunction with the accompanying drawings wherein:

BRIEF DESCRIPTION OF THE DRAWINGS

FIG. 4 is a fragmentary cross sectional view taken substantially along line 4—4 of FIG. 2;

FIG. 5 is a fragmentary cross sectional view taken substantially along line 5—5 of FIG. 4 and showing the internal structure of each shock and vibration isolator and the structure for mounting each isolator on the underwater body;

FIG. 6 is a fragmentary view taken substantially in the direction of lines 6—6 of FIG. 5 and showing the structure of the vent ring of the shock and vibration isolator;

FIG. 7 is a cross sectional view taken substantially along line 7—7 of FIG. 5 and showing the connection between the metal and rubber parts of the plunger;

DESCRIPTION OF THE PREFERRED EMBODIMENTS

Figure 1:
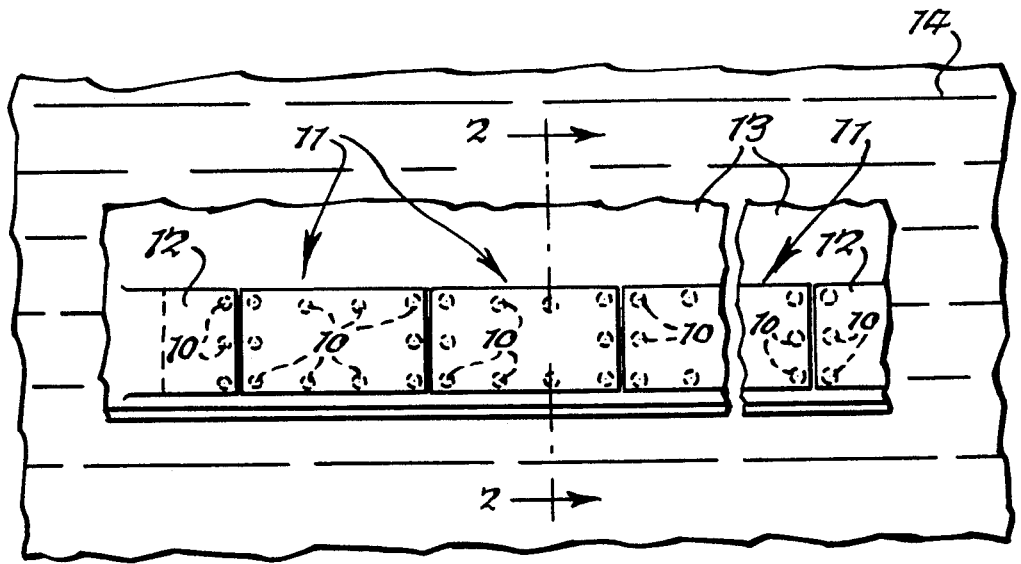
FIG. 1 is a fragmentary side elevational view of a body submerged in water and having a plurality of shock and vibration isolators of the present invention supporting members on the underwater body.
Figure 2:
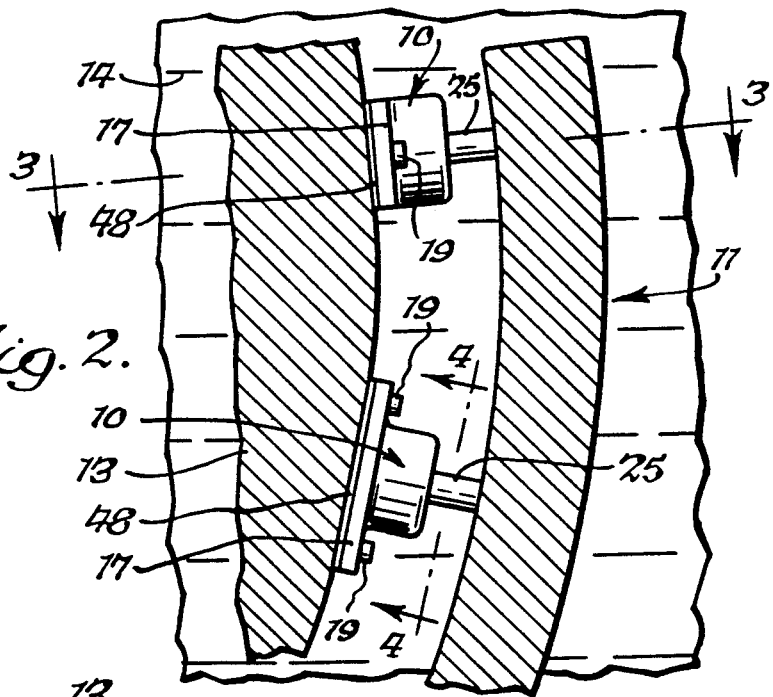
FIG. 2 is a fragmentary cross sectional view taken substantially along line 2—2 of FIG. 1.
Figure 3:
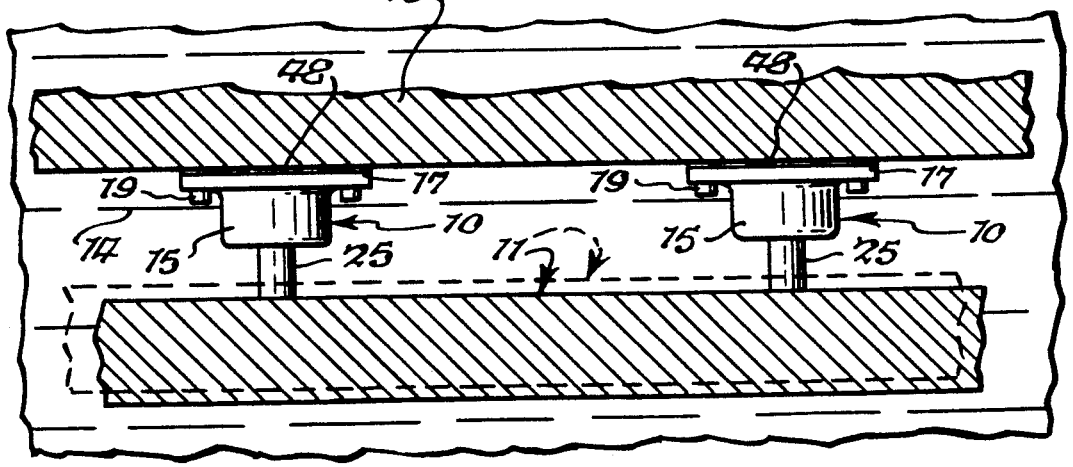
FIG. 3 is a fragmentary cross sectional view taken substantially along line 3—3 of FIG. 2.

By way of background, sonar arrays 11 and fairing 12 associated therewith are mounted on the portion of the hull 13 of a ship or submarine submerged in water 14 for the purpose of receiving or transmitting sonar echos. It is important that arrays 11 and fairings 12 be protected against shock and vibration forces from both the hull and external sources so that such forces would not interfere with proper sonar transmission and reception. Accordingly, a plurality of shock and vibration isolators 10 of the present invention are utilized to this end. The electrical cables between the sonar arrays 11 and the hull 13 for transmission of signals are not shown in the drawings.

Each shock and vibration isolator 10, hereafter referred to as isolator 10, includes a rigid metal housing 15 terminating at its lower end in a base or footing 17 through which a plurality of screws 19 extend for securing housing 15 to hull 13. The portion of housing 15 extending outwardly from base 17 is substantially cylindrical and it terminates at a flange-like end portion 20 having a circular opening 21 therein.

Associated with housing 15 is a plunger 22 which consists of a flexible resilient rubber body 23 located within housing 15 which has embedded in it the base 24 of a metal stem 25 which extends outwardly through opening 21 for receiving a screw 27 extending outwardly from sonar array 11. As can be seen from FIG. 7, there are a plurality of holes 29 in base 24, and portions 30 of the rubber portion 23 of the plunger are molded through these holes to securely hold base 24 in rubber member 23. Rubber member 23 of plunger 22 is molded in the configuration shown in FIGS. 5 and 7. More specifically, it includes a generally spherical concave surface 31, an annular groove 32, a tapered cutaway annular end 33 and a tapered cutaway annular end 34. Annular surfaces 35 and 37 bear against inner cylindrical wall 39 of housing 15, and annular end 40 of rubber member 23 bears against the inner surface of housing end 20. Housing 15 confines rubber body 23 and causes it to function as a plunger.

A vent ring 41 has an outer edge 42 (FIG. 6) which is located under annular shoulder 43 of housing 15. Vent ring 41 consists of a metal plate 44 having a plurality of grooves 45 extending radially outwardly from a central opening 47 and terminating at scalloped ends 49. A flexible gasket 48 is interposed between hull 13 and base 17 of housing 15 and plate 44 to provide good sealing therebetween. Vent ring 41 is essentially part of the housing in that the rubber body 23 is confined between housing 15 and the vent ring 41.

A chamber 50, which is essentially a segment of a sphere, is defined by spherical surface 31 and planar surface 51 of plate 44. Communication exists between chamber 50 and the water 14 on the outside of the hull 13 via bores 52 in housing 15, annular chamber 53, scallops 49, grooves 45 and circular opening 47. In addition, venting of annular groove 32 on the side of rubber portion 23 is effected through bores 54 in housing 15. Additionally, venting is effected to annular chamber 55 through a plurality of bores 57 in housing 15 which are spaced from bores 54. Additionally, water can enter frustoconical chamber 59 through circular opening 21 in housing end 20.

The rubber body 23 creates a resilient cushioning between hull 13 and sonar arrays 11 and fairing 12. Additionally, rubber body 23 acts as a plunger to expel water from chamber 50 through the above-described path leading to bores 52 as chamber 50 is reduced in size when surface 31 of rubber body 23 is moved toward plate 44. Rubber body 23 also sucks water into chamber 50 through the same path as the chamber 50 increases in size when surface 31 moves away from plate 44. It is the pumping of water into and out of chamber 50 which performs the shock damping. While a specified number of bores 52 are shown in the drawings, it will be appreciated that the degree of hydraulic damping can be determined by varying the size, number and shape of bores 52 and the number, size and shape of the grooved conduits 45.

The cross sectional contour of rubber plunger portion 23 as shown in FIG. 5 produces the desired flexing thereof under shock loading. The annular groove 32 in conjunction with the portions defined by annular surfaces 35 and 37 and the thinner central portion in which the metal base 24 is embedded produce the desired flexing of rubber body 23 so that chamber 50 can be varied in size in response to shock loads to thereby provide the above-described pumping action which produces damping. In this respect, as the stem 25 moves inwardly or outwardly or transversely, the annular groove 32 provides a space for the adjacent portions of body 32 to expand into. During flexing, annular surfaces 35 and 37 of rubber body 23 maintain proper engagement with the inner surface 39 of the housing. The flow of water through vents 54 and 57 as rubber body 23 is flexed also contributes to shock absorption because vents 54 and 57 prevent the creation of vacuum zones between the outer surface of rubber body 23 and the inner surface 39 of housing 15. Also, there is a certain amount of damping due to the flow of water through vents 54 and 57. While a specified number of vents 54 and 57 have been shown, it will be appreciated that the number, size and shape of these vents can be varied. Furthermore, the bores 54 and 57 provide openings for the ingress and egress of water which is utilized for lubrication between the annular surfaces 35 and 37 of water body 23 and the inside surface 39 of housing 15. It will be appreciated that the damping and shock absorption characteristics of the isolator 10 can be engineered for specific applicatons by varying the shape and flexibility of the rubber body 23 and by varying the size, number and shape of the various vents and conduits.

Figure 8:
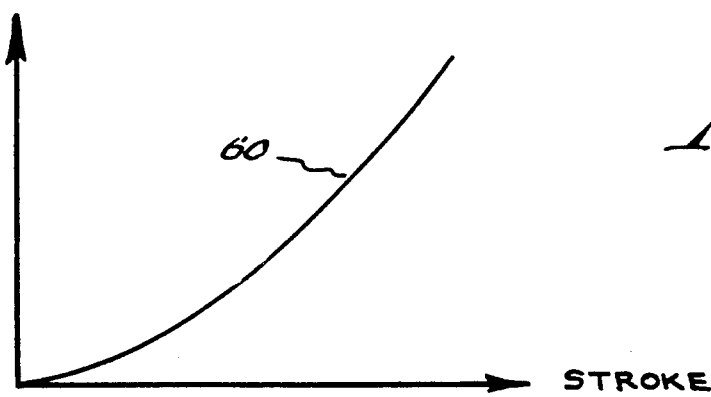
FIG. 8 is a graph of force versus stroke of a plain rubber spring under a shock loading force.
Figure 9:
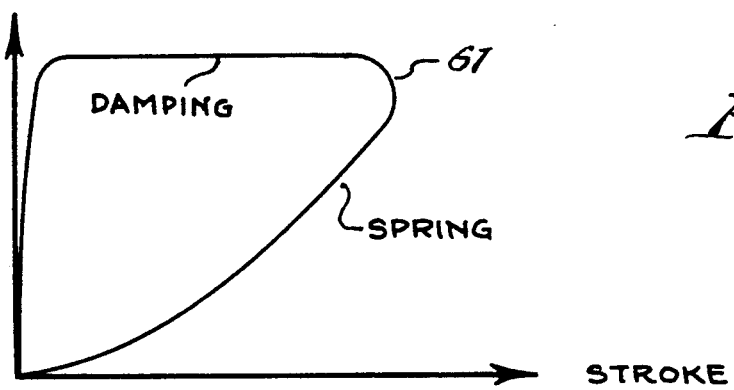
FIG. 9 is a graph of force versus stroke of a shock load applied to the shock and vibration isolator of the present invention.
Figure 10:
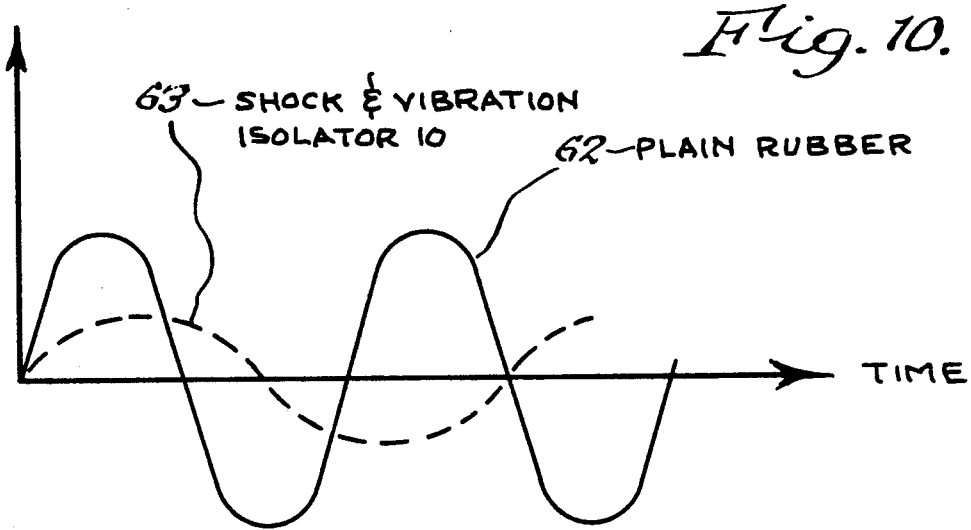
FIG. 10 is a graph of stroke versus time comparing a plain rubber mounting with the shock and vibration isolator mounting of the present invention.

In FIG. 8 the graph 60 of force versus stroke shows the action of a rubber spring under shock loading. The graph 61 of FIG. 9 shows the force versus stroke of the shock and vibration isolator 10 of the present invention under shock loading, thereby illustrating the damping effect due to the action of the plunger working with the water in the above-described manner. FIG. 10 shows both a graph 62 of stroke versus time for a plain rubber mounting and a graph 63 of the improved shock and vibration isolator 10 of the present invention under forced vibration. Thus, it can readily be seen from a comparison of FIGS. 8, 9 and 10 that the improved shock and vibration isolator of the present invention is manifestly capable of providing improved shock and vibration isolation for members which are supported on the hull of a submerged body.

While a preferred embodiment of the present invention has been disclosed, it will be appreciated that it is not limited thereto but may be otherwise embodied within the scope of the following claims.

What is claimed is:

1. In a construction wherein a member is associated with a ship hull which is immersed in water, a shock and vibration isolator for mounting said member on said ship hull and isolating said member from shock and vibration forces to which said immersed ship hull may be subjected comprising a unit consisting of a housing and elastomeric means in said housing for providing isolation of said member from both vibration and shocks to which said ship hull may be subjected, chamber means defined by said elastomeric means for containing water, conduit means for effecting communication between said chamber means and said water in which said ship hull is immersed, and coupling means for fixedly mounting said member on said elastomeric means to thereby provide isolation of said member from shock and vibration forces to which said ship hull may be subjected as a result of both flexing of said elastomeric means and water being pumped into and out of said chamber through said conduit means as a result of said flexing of said elastomeric means.

2. In a construction as set forth in claim 1 wherein said coupling means comprises a stem having a portion embedded in said elastomeric means, and a portion coupled to said member.

3. In a construction as set forth in claim 1 wherein said chamber means comprises a configuration of said elastomeric means in combination with a portion of said housing.

4. In a construction as set forth in claim 1 wherein said coupling means comprises a stem affixed to said elastomeric means and extending outwardly from said housing.

5. In a construction wherein a member is associated with a ship hull which is immersed in water, a shock and vibration isolator for mounting said member on said ship hull and isolating said member from shock and vibration forces to which said immersed ship hull may be subjected comprising a unit consisting of a housing and elastomeric means in said housing for providing isolation of said member from both vibration and shocks to which said ship hull may be subjected, chamber means defined by said elastomeric means for containing water, conduit means for effecting communication between said chamber means and said water in which said ship hull is immersed, and coupling means for fixedly coupling said elastomeric means to said member to thereby provide isolation of said member from shock and vibration forces to which said ship hull may be subjected, said shock and vibration isolation being as a result of both flexing of said elastomeric means and water being pumped into and out of said chamber through said conduit means as a result of said flexing of said elastomeric means, said chamber means comprising a configuration of said elastomeric means in combination with a portion of said housing, said portion of said housing including a plate, and said conduit means comprising slots in said plate in communication with said chamber means.

6. In a construction as set forth in claim 5 wherein said conduit means also include bores in said housing for effecting communication between said slots and said water in which said ship hull is immersed.

7. A shock and vibration isolator for a member mounted on a body immersed in water for isolating said member from shock and vibration forces to which said body may be subjected comprising a housing, first and second end portions in said housing, a base on said first end portion, means for securing said base to said body which is immersed in water, a plate located at said first end portion of said housing, an elastomeric member in said housing, said elastomeric member having first and second ends, means on said first end of said elastomeric member for defining a chamber in conjunction with said plate, conduit means in communication with said chamber for conducting water in which said body is immersed to said chamber, an opening in said second end of said housing, a stem connected to said elastomeric member and extending outwardly through said opening in said second end of said housing, confining means on said elastomeric member for confining said elastomeric member in said housing, and means on said stem for fixedly coupling said stem to said member to thereby cause said elastomeric member to provide isolation from shock and vibration forces to which said body may be subjected, said shock and vibration isolation being obtained as a result of both flexing of said elastomeric member and water being pumped into and out of said chamber through said conduit means as a result of said flexing of said elastomeric member.

8. A shock and vibration isolator as set forth in claim 7 wherein said conduit means are in said plate.

9. A shock and vibration isolator as set forth in claim 8 including seal means for providing a seal between said plate and said body, and wherein said conduit means comprise slots in said plate in conjunction with said seal means.

10. A shock and vibration isolator as set forth in claim 9 wherein said slots extend radially outwardly from an aperture in said plate which is in communication with said chamber.

11. A shock and vibration isolator as set forth in claim 8 including bore means in said housing in communication with said conduit means in said plate for conducting water to and from said conduit means.

12. A shock and vibration isolator as set forth in claim 11 wherein said stem includes a portion which is embedded in said elastomeric member.

13. A shock and vibration isolator as set forth in claim 12 wherein said means for confining said elastomeric member within said housing comprises an abutting relationship between said second end of said elastomeric member and said second end portion of said housing.

14. A shock and vibration isolator as set forth in claim 13 including a central housing portion of said housing between said first and second end portions, a central elastomeric member portion between said first and second ends of said elastomeric member, an annular groove in said central elastomeric member portion, and vent means in said central housing portion for effecting communication between said annular groove and said water in which said body is immersed.

15. A shock and vibration isolator as set forth in claim 14 including additional vent means in said housing on the opposite side of said vent means from said first end of said housing.

16. A shock and vibration isolator as set forth in claim 7 wherein said stem includes a portion which is embedded in said elastomeric member.

17. A shock and vibration isolator as set forth in claim 7 wherein said means for confining said elastomeric member within said housing comprises an abutting relationship between said second end of said elastomeric member and said second end portion of said housing.

18. A shock and vibration isolator as set forth in claim 7 including a central housing portion of said housing between said first and second end portions, a central elastomeric member portion between said first and second ends of said elastomeric member, an annular groove in said central elastomeric member portion, and vent means in said central housing portion for effecting communication between said annular groove and said water in which said body is immersed.

* * * * *